US008737088B2

(12) United States Patent
Chang

(10) Patent No.: US 8,737,088 B2
(45) Date of Patent: May 27, 2014

(54) PORTABLE ELECTRONIC DEVICE WITH CHIP CARD HOLDER

(75) Inventor: Chia-Hsin Chang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 110 days.

(21) Appl. No.: 13/453,156

(22) Filed: Apr. 23, 2012

(65) Prior Publication Data

US 2013/0235548 A1    Sep. 12, 2013

(30) Foreign Application Priority Data

Mar. 8, 2012   (CN) .......................... 2012 1 0059701

(51) Int. Cl.
*H05K 7/02* (2006.01)
(52) U.S. Cl.
USPC ........... 361/810; 361/737; 361/748; 361/752; 361/754; 361/759

(58) Field of Classification Search
USPC ......... 361/737, 748, 752, 754, 759, 769, 787, 361/798, 801, 825, 829, 679.31–679.32, 361/679.38–679.39, 727
See application file for complete search history.

(56) References Cited

U.S. PATENT DOCUMENTS

| | | | |
|---|---|---|---|
| 7,233,489 B2 * | 6/2007 | Toyama et al. | 361/679.31 |
| 2011/0092087 A1 * | 4/2011 | Jung et al. | 439/159 |
| 2011/0267787 A1 * | 11/2011 | Duan et al. | 361/756 |

* cited by examiner

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

A portable electronic device includes a housing and a chip card holder. The chip card holder includes a base fixed to the housing, a drawer slidably fixed to the base. The drawer includes at least two stacked receiving grooves, each receiving groove receives one of the chip cards.

10 Claims, 6 Drawing Sheets

PORTABLE ELECTRONIC DEVICE WITH CHIP CARD HOLDER

BACKGROUND

1. Technical Field

The present disclosure relates to portable electronic devices, and particularly to portable electronic devices with chip card holders.

2. Description of Related Art

A dual-SIM mobile terminal may have one or two SIM cards. A dual-SIM mobile terminal with two SIM cards can switch SIM cards according to a user selection. That is, the user of a dual-SIM mobile terminal with two SIM cards can use two phone numbers.

Typical chip card holder define two receiving grooves side-by-side for receiving the SIM cards, thereby occupying a large area of the mobile terminal.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and portable electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
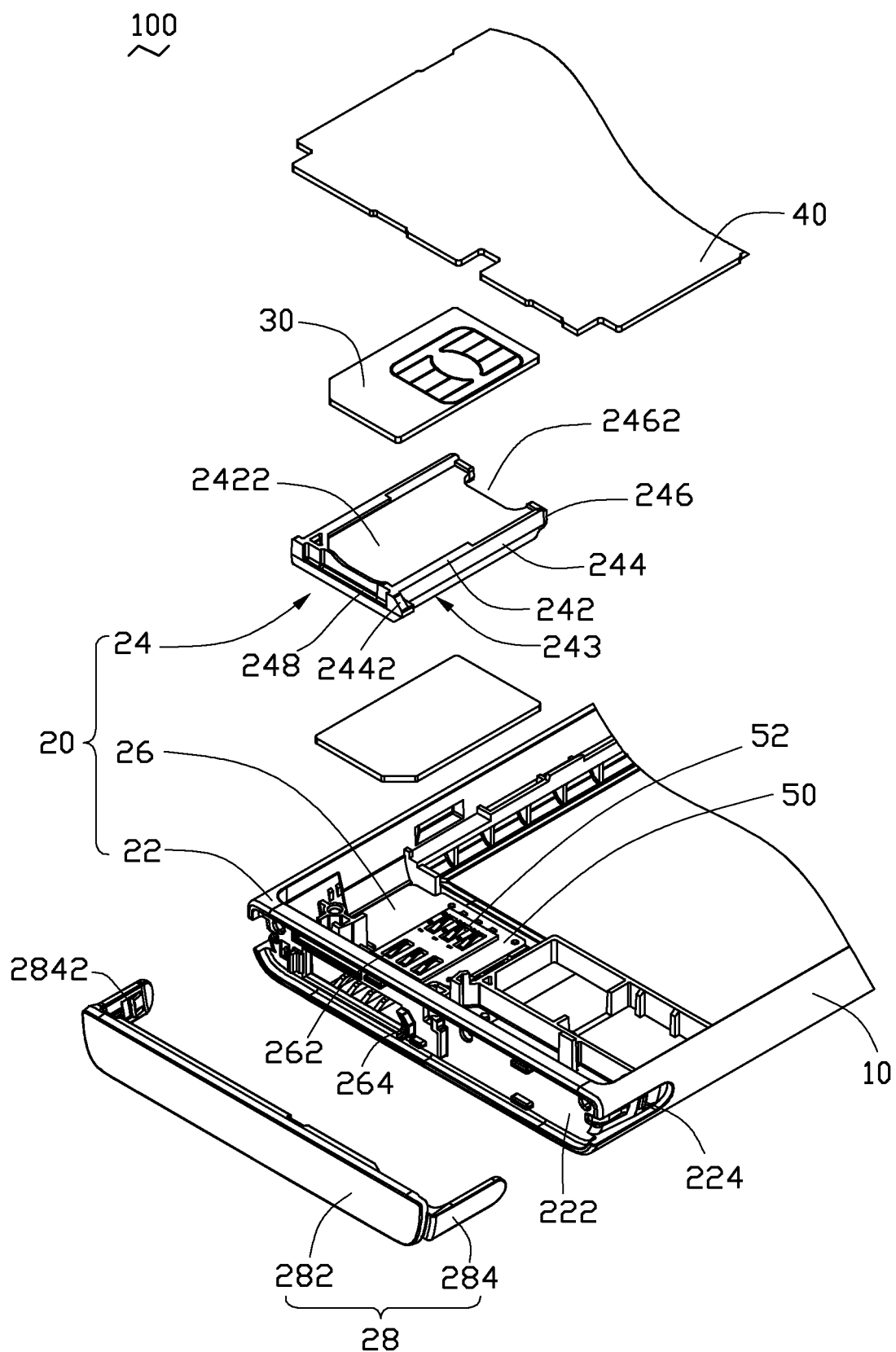
FIG. 1 is an exploded view of one embodiment of a chip card holder as used in a portable electronic device, the portion of the portable electronic device including a housing, a chip card and a chip card holder.
Figure 2:
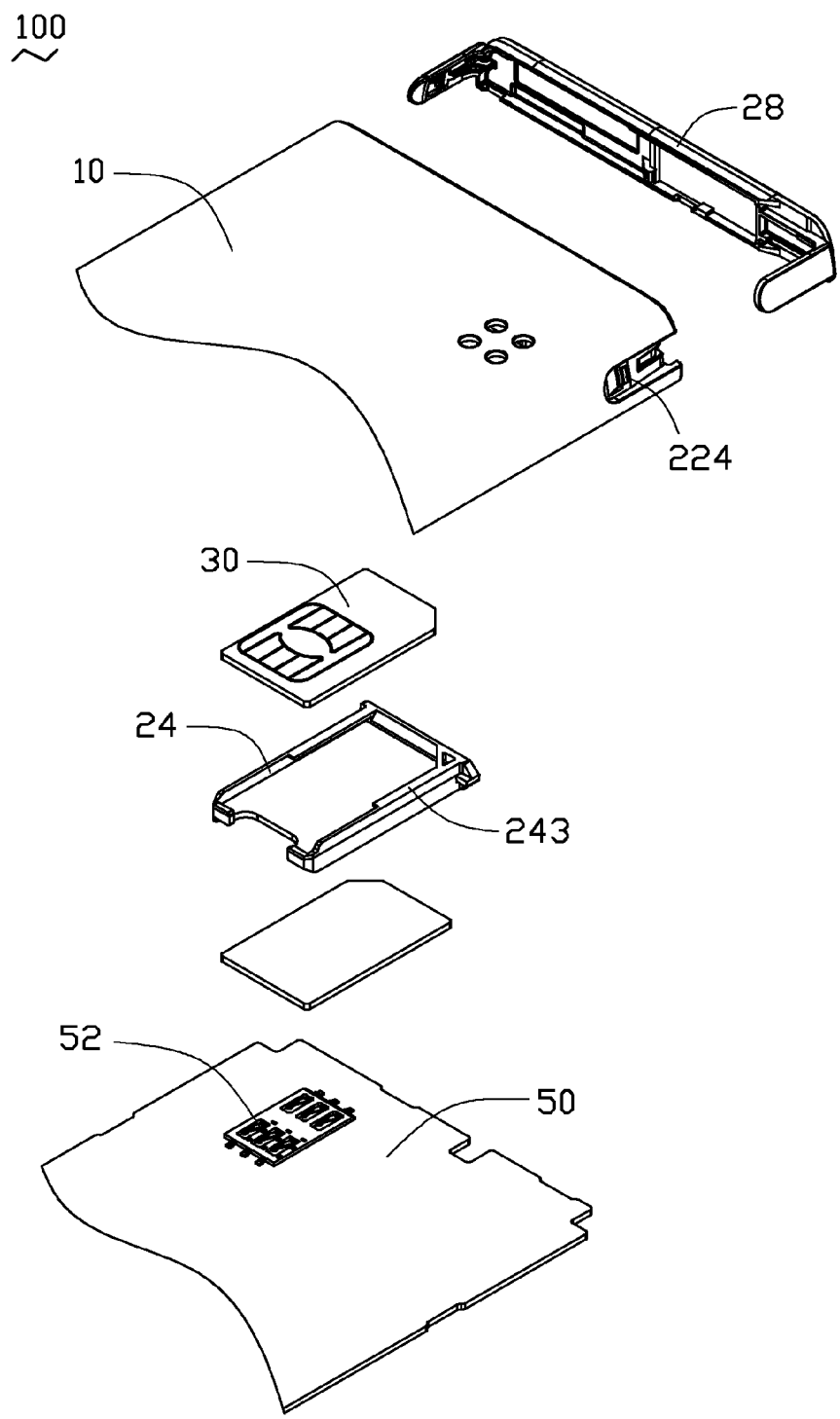
FIG. 2 is similar to FIG. 1, but viewing from anther aspect.
Figure 3:
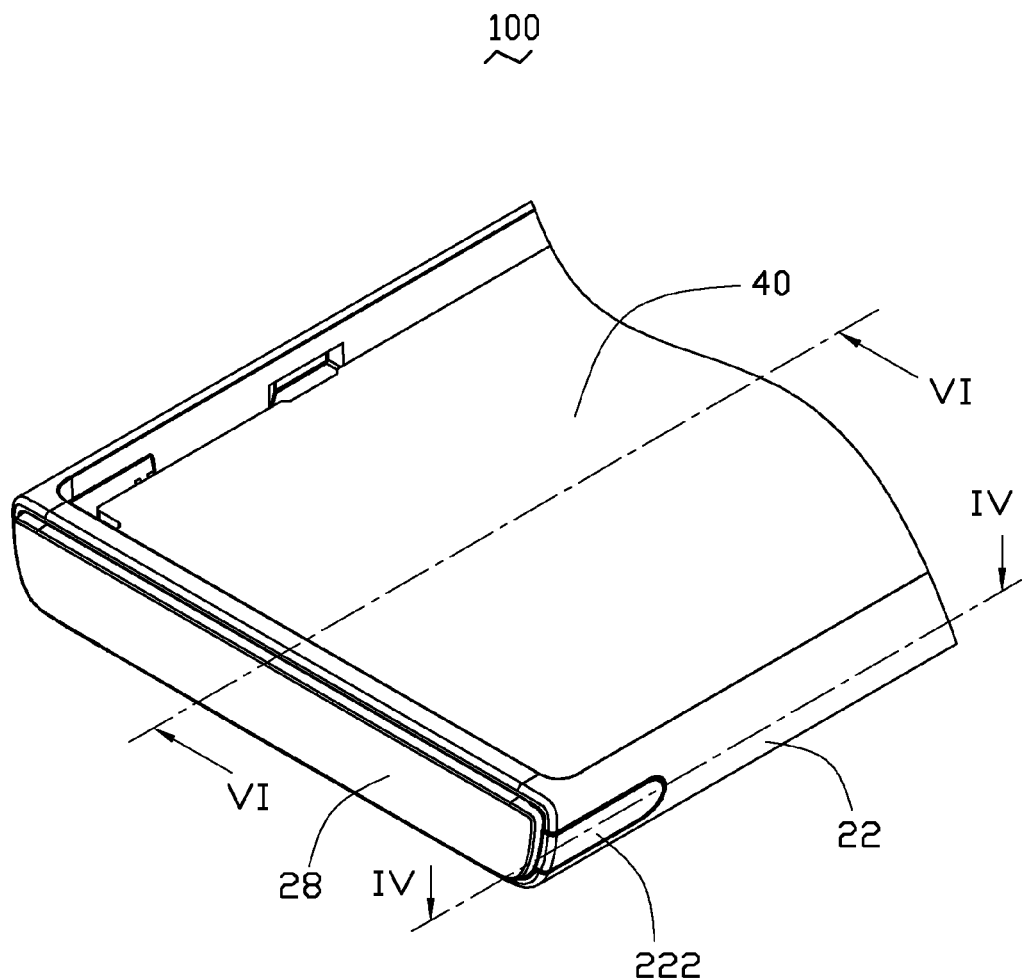
FIG. 3 is an assembled view of the portable electronic device.

Referring to FIGS. 1 to 3, an exemplary embodiment of a chip card holder 20 which can be used on a portable electronic device 100, such as a cellular phone or any electronic device where a chip card is required. The portable electronic device 100 includes a housing 10, a chip card holder 20, two chip cards 30, a first print circuit board (PCB) 40 and a second PCB 50. The chip card holder 20 is fixed to the housing 10. Chip cards 30 can be fixed to the chip card holder 20. The chip cards 30 may be subscriber identity module (SIM) cards or flash cards; or one of each. The first PCB 40, second PCB 50 are both fixed to the housing 10.

The chip card holder 20 includes a base 22, a drawer 24 and a cabinet 26. The cabinet 26 is defined in the base 22, in which the drawer 24 is received.

The base 22 may be a portion of the housing 10 or a separate element fixed to the housing 10. In this exemplary embodiment, the base 22 is a portion of the housing 10.

The drawer 24 includes a first surface 242, a second surface 243 opposite to the first surface 242, two opposite sidewalls 244, a first end 246 and a second end 248 opposite to the first end 246. The first surface 242 and the second surface 243 each define a receiving groove 2422, in which one of the chip or flash cards 30 is received. Two limiting blocks 2442 protrudes from the sidewalls 244. In this exemplary embodiment, the limiting blocks 2442 are located near the second end 248. A cutout 2462 is defined at the first end 246 and communicates with the receiving grooves 2422. The cutout 2462 facilitates an user grasping chip cards 30 in the receiving grooves 2422.

The cabinet 26 has a shape complementary to the drawer 24, the cabinet 26 includes a compartment 262 and two limiting grooves 264. The drawer 24 is slidably received in the compartment 262. The limiting grooves 264 are located at two sides of the compartment 262 and communicate the compartment 262. Each limiting block 2442 is slidably received in one of the limiting grooves 264, to limit a movement maximum of the drawer 24 sliding relative to the base 22.

The first PCB 40 includes a first connector 42. The second PCB 50 includes a second connector 52.

Furthermore, the chip card holder 20 further includes a cover 28 covering the drawer 24 and detachably fixed to the base 22 so the drawer 24 is steadily fixed in the cabinet 26. In this exemplary embodiment, the cover 28 is substantially U-shaped, and includes a main body 282 and two latching portions 284 protruding from opposite ends of the main body 282. Each latching portion 284 includes a latching block 2842. The base 22 defines a slot 222 for accommodating the cover 28. The base 22 further defines two latching grooves 224. Each latching block 2842 is latched in one of the latching grooves 224 so the cover 28 is latched in the slot 222 and the main body 282 presses the drawer 24 in the cabinet 26.

Figure 4:
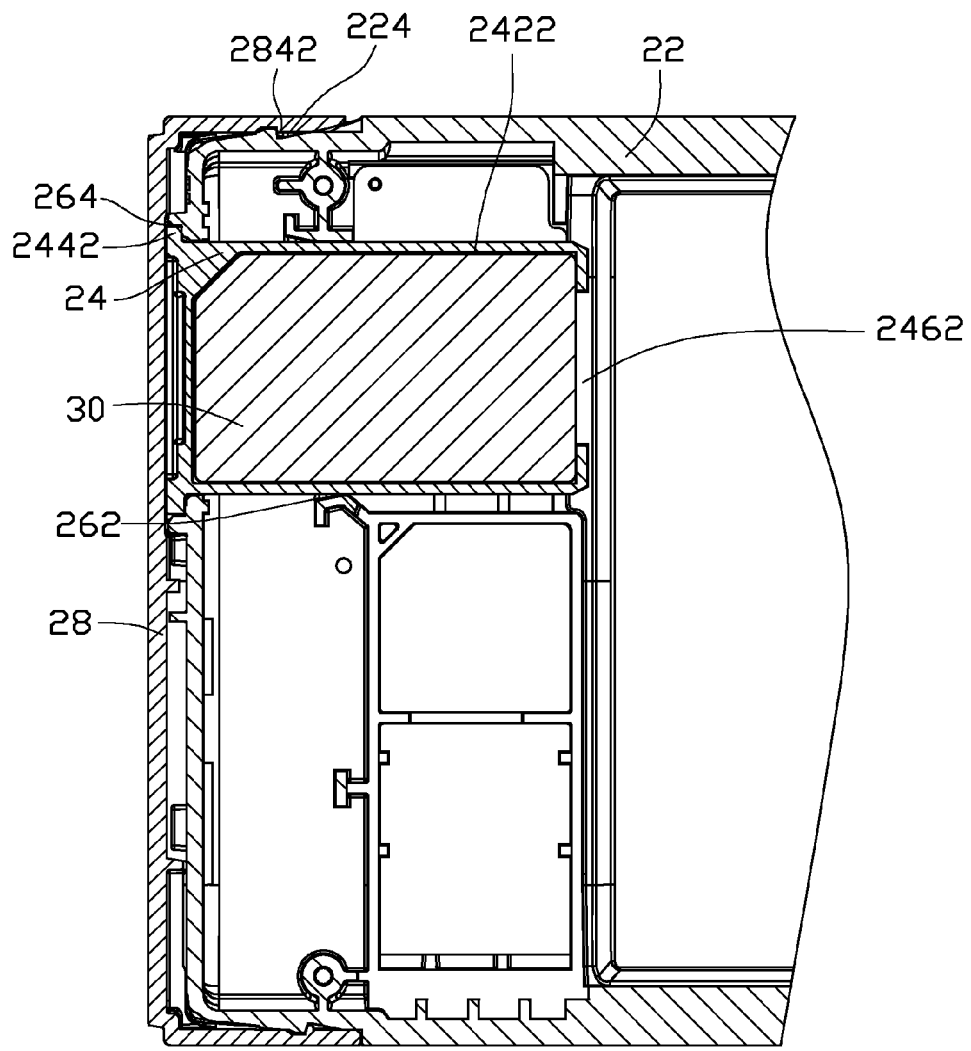
FIG. 4 is a cross sectional view of the portable electronic device of FIG. 3 along the line of IV-IV.
Figure 5:
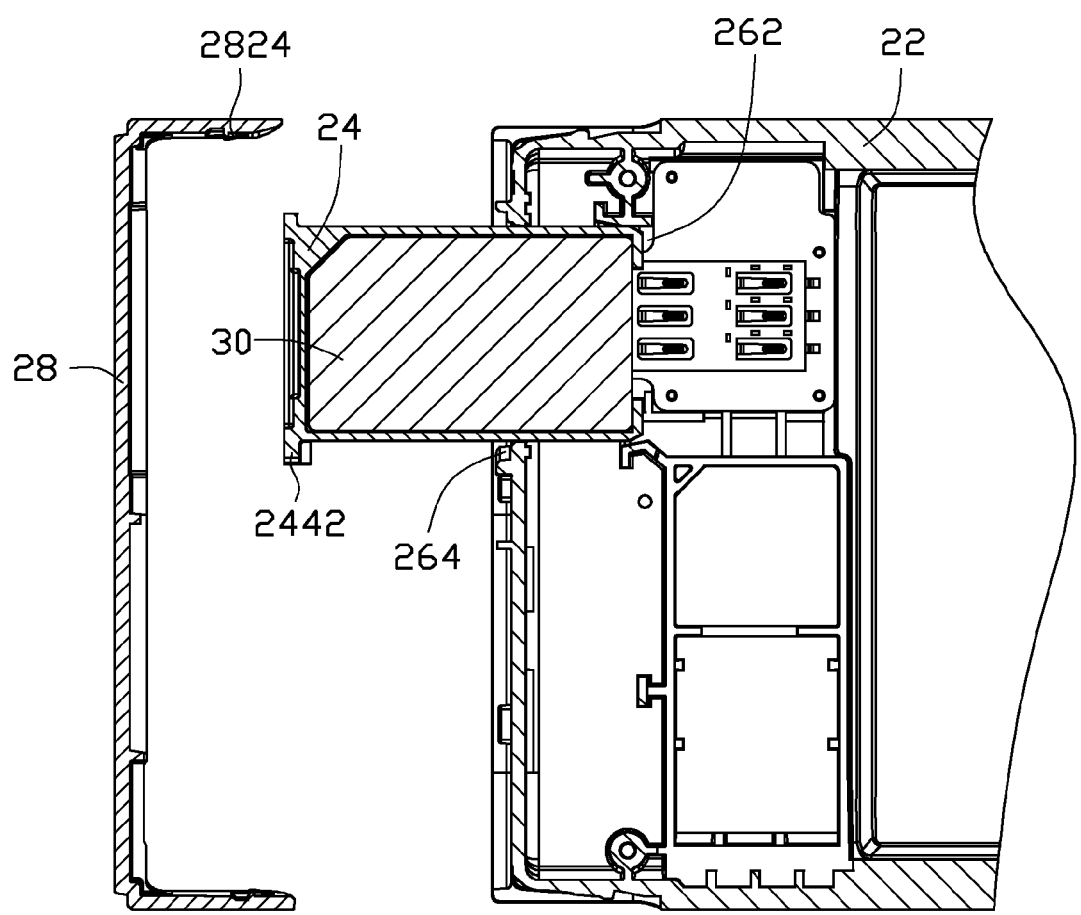
FIG. 5 is similar to FIG. 4, but the chip card is ejected out of the housing.
Figure 6:
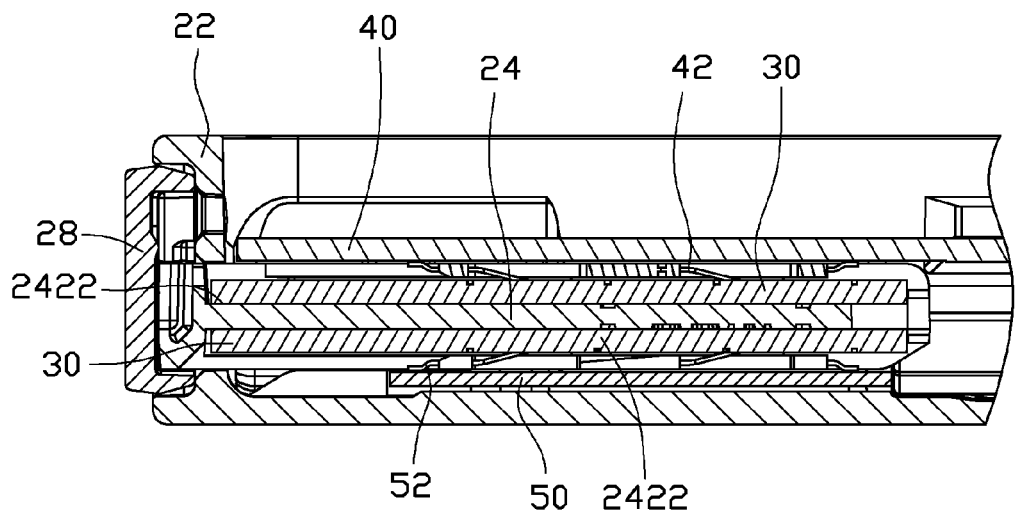
FIG. 6 is a cross sectional view of the portable electronic device of FIG. 3 along the line of VI-VI.

Referring to FIGS. 4 to 6, in use, the latching blocks 2842 are released from the latching grooves 224. The cover 28 is detached from the housing 10. The drawer 24 is slided out of the cabinet 26. The chip cards 30 are put into the receiving grooves 2422. The drawer 24 is inserted into the compartment 262 of the cabinet 26 until the limiting blocks 2442 are limited in the limiting grooves 264. At this time, the chip cards 30 respectively and electrically connect with the first connector 42 and the second connector 52, yielding putting the chip cards 30 in the portable electronic device 100.

In above chip card holder 20, the drawer 24 can slide out of the cabinet 26 to expose it from the base 22, thereby facilitating grasping chip cards 30 out of the receiving grooves 2422 or putting the chip cards 30 in the receiving grooves 2422. Additionally, the receiving grooves 2422 are arranged in a stack, thereby reducing the area occupied by the chip card holder 20.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder for holding at least two chip cards, the chip card holder comprising:
  a base;
  a drawer slidably assembled to the base, the drawer including at least two stacked receiving grooves, each receiving groove receiving a chip card;
  a cabinet defined in the base, the drawer slidably received in the cabinet; and a cover covering the drawer and detachably fixed to the base so the drawer is steadily fixed in the cabinet;

wherein the cover includes a main body and two latching portions protruding from opposite ends of the main body, each latching portion includes a latching block; the base defines a slot and two latching grooves; each latching block is latched in one of the latching grooves to latch the cover in the slot and the main body presses the drawer in the cabinet.

2. The chip card holder of claim 1, wherein the drawer includes a first surface and a second surface opposite to the first surface, the first surface and the second surface each define at least one receiving groove.

3. The chip card holder of claim 2, wherein the drawer further includes two opposite sidewalls, a limiting block protrudes from each sidewall; the cabinet includes a compartment and two limiting grooves; the drawer is slidably received in the compartment; the limiting grooves are located at two sides of the compartment and communicate with the compartment, each limiting block is slidably accommodated in one of the limiting grooves to limit a movement maximum of the drawer sliding relative to the base.

4. The chip card holder of claim 3, wherein the drawer includes a first end where a cutout is defined, the cutout communicates with the receiving grooves to facilitate grasping chip cards in the receiving grooves.

5. The chip card holder of claim 4, wherein the drawer includes a second end opposite to the first end, the limiting blocks located near the second end.

6. A portable electronic device, comprising:
a housing;
a chip card holder comprising:
a base fixed to the housing;
a drawer slidably attached to the base, the drawer including at least two stacked receiving grooves, each receiving groove receiving one of the chip cards;
a cabinet defined in the base, the drawer slidably received in the cabinet; and
a cover covering the drawer and detachably fixed to the base so the drawer is steadily fixed in the cabinet;

wherein the cover includes a main body and two latching portions protruding from opposite ends of the main body, each latching portion includes a latching block; the base defines a slot and two latching grooves; each latching block is latched in one of the latching blocks to latch the cover in the slot and the main body presses the drawer in the cabinet.

7. The portable electronic device of claim 6, wherein the drawer includes a first surface and a second surface opposite to the first surface, the first surface and the second surface each define at least one receiving groove.

8. The portable electronic device of claim 7, wherein the drawer further includes two opposite sidewalls, a limiting block protrudes from each sidewall; the cabinet includes a compartment and two limiting grooves; the drawer is slidably received in the compartment; the limiting grooves are located at two sides of the compartment and communicate with the compartment, each limiting block is slidably accommodated in one of the limiting grooves to limit a movement maximum of the drawer sliding relative to the base.

9. The portable electronic device of claim 8, wherein the drawer includes a first end where a cutout is defined, the cutout communicates with the receiving grooves to facilitate grasping chip cards in the receiving grooves.

10. The portable electronic device of claim 9, wherein the drawer includes a second end opposite to the first end, the limiting blocks located near the second end.

* * * * *